(No Model.) 5 Sheets—Sheet 1.

E. GOBBE.
FURNACE FOR GLASS WORKS.

No. 463,149. Patented Nov. 17, 1891.

WITNESSES
INVENTOR (No Model.) 5 Sheets—Sheet 2.

E. GOBBE.
FURNACE FOR GLASS WORKS.

No. 463,149. Patented Nov. 17, 1891.

WITNESSES
INVENTOR (No Model.) 5 Sheets—Sheet 3.
E. GOBBE.
FURNACE FOR GLASS WORKS.
No. 463,149. Patented Nov. 17, 1891.
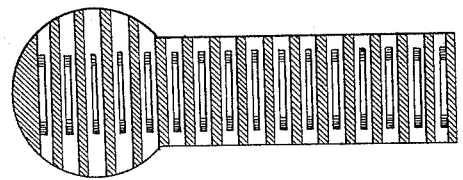
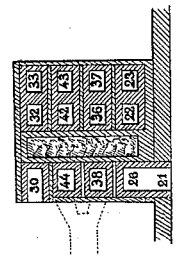
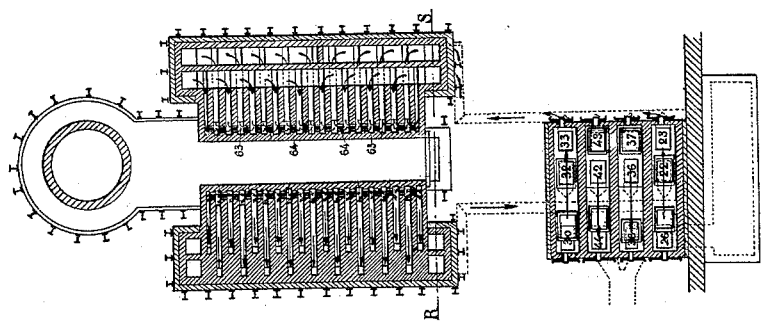
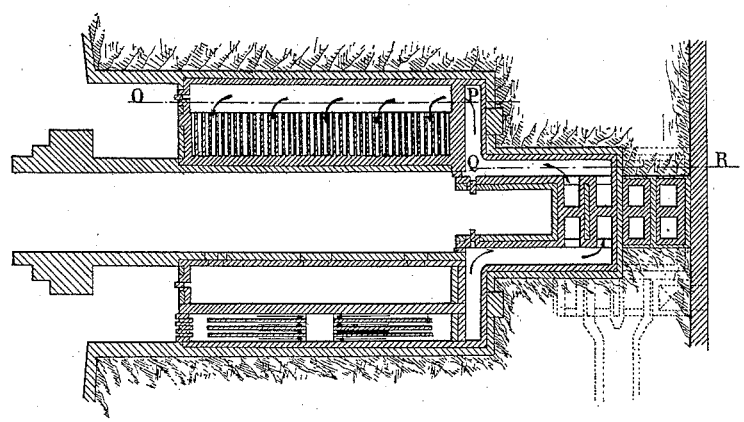
WITNESSES
INVENTOR (No Model.) 5 Sheets—Sheet 4.
E. GOBBE.
FURNACE FOR GLASS WORKS.
No. 463,149. Patented Nov. 17, 1891.
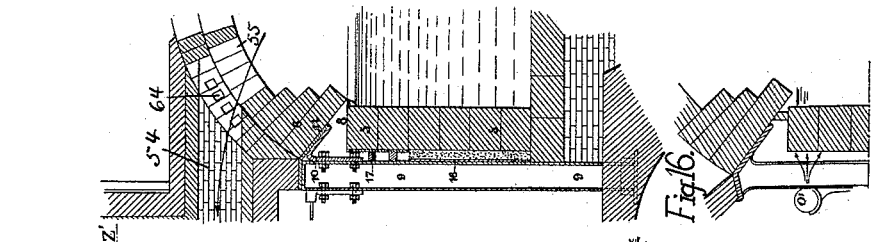
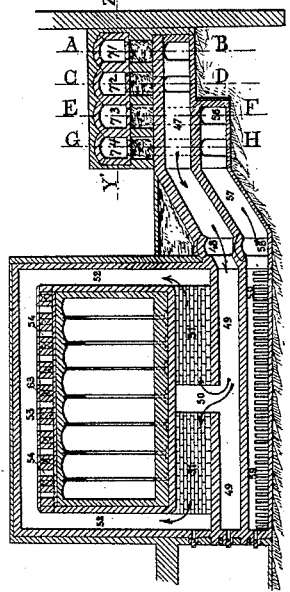
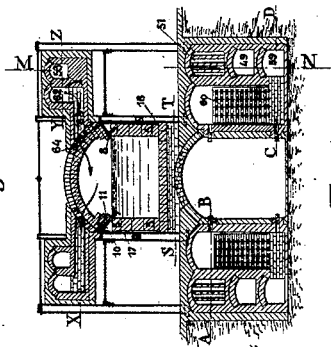
WITNESSES
INVENTOR
Emile Gobbe (No Model.) 5 Sheets—Sheet 5.
E. GOBBE.
FURNACE FOR GLASS WORKS.
No. 463,149. Patented Nov. 17, 1891.
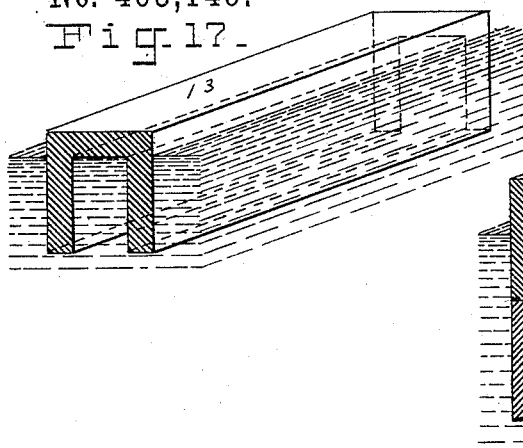
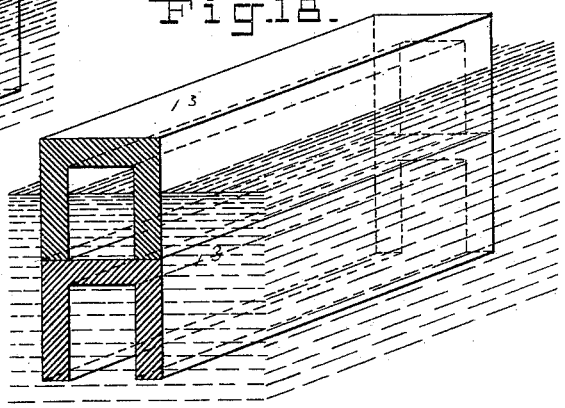
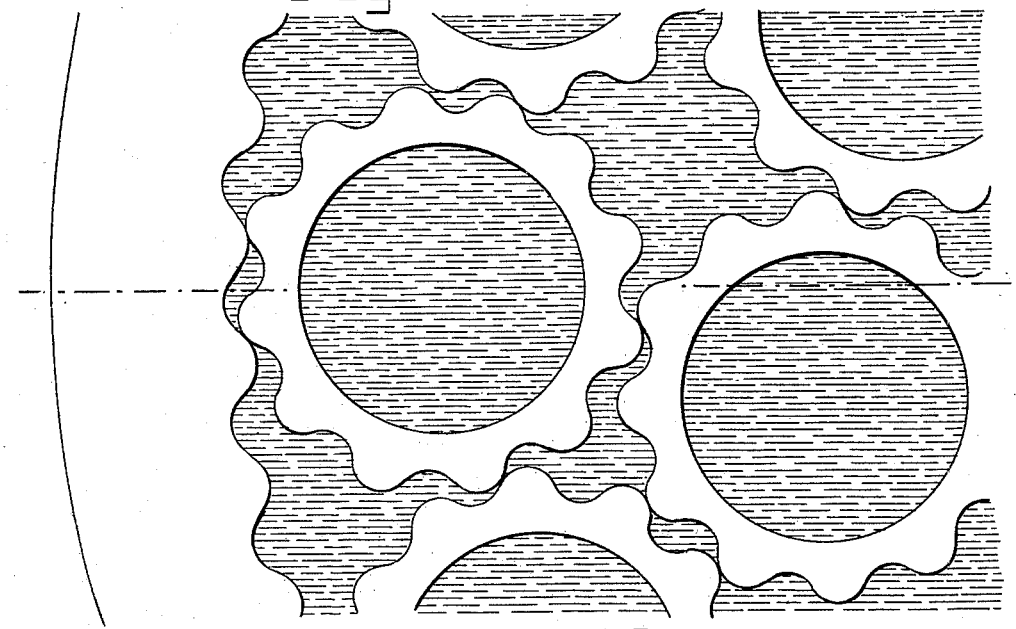
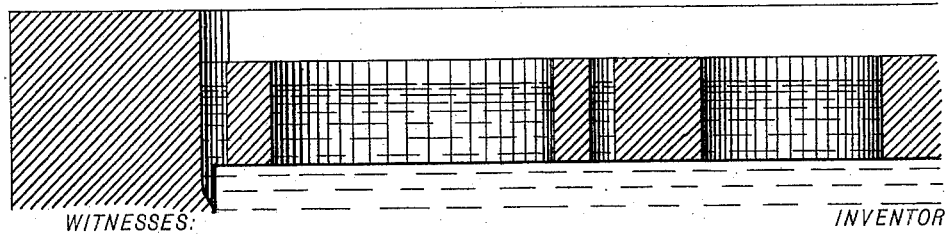
WITNESSES:
E. B. Bolton
M. A. Walsh
INVENTOR
Emile Gobbe
BY
Richards &
ATTORNEYS

UNITED STATES PATENT OFFICE.

EMILE GOBBE, OF ANICHE, FRANCE.

FURNACE FOR GLASS-WORKS.

SPECIFICATION forming part of Letters Patent No. 463,149, dated November 17, 1891.

Application filed August 30, 1889. Serial No. 322,396. (No model.) Patented in France February 1, 1887, No. 181,246, and in Belgium March 17, 1887, No. 76,740.

*To all whom it may concern:*

Be it known that I, EMILE GOBBE, a citizen of the French Republic, residing at Aniche, France, have invented new and useful Improvements in Furnaces for Glass-Works, (for which I have obtained a patent in France under the date of February 1, 1887, No. 181,246, and in Belgium under the date of March 17, 1887, No. 76,740,) of which the following is a full, clear, and exact description.

My invention consists in certain parts and combinations thereof, hereinafter more fully described and claimed.

Figure 1:
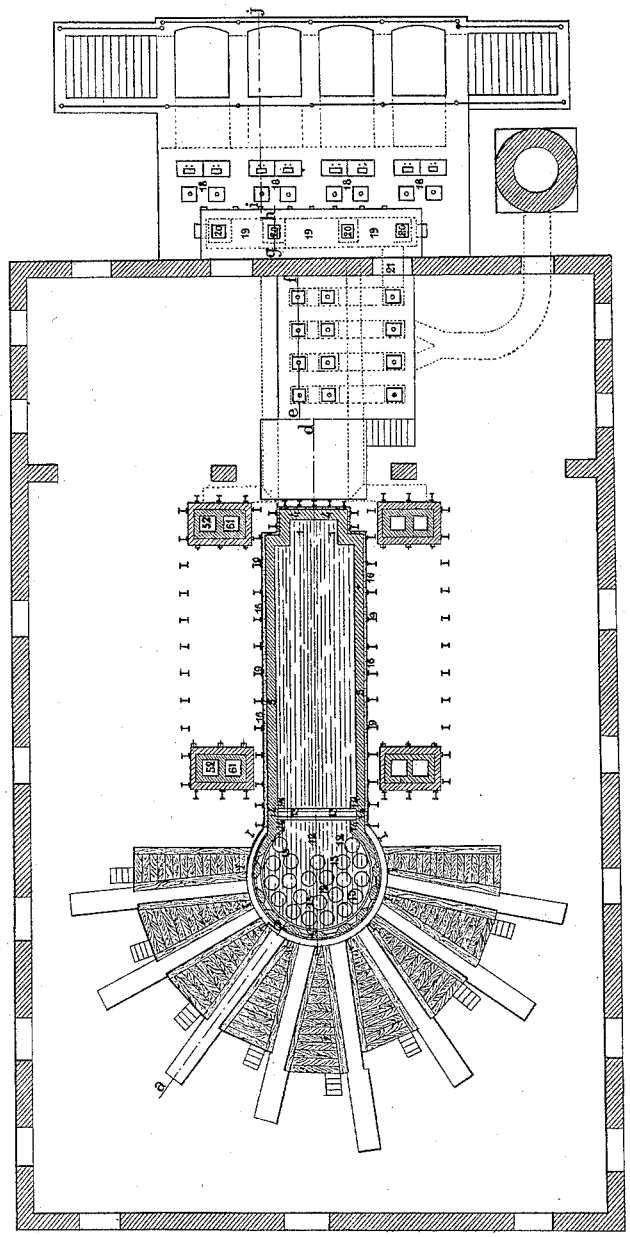
Figures 2, 3:
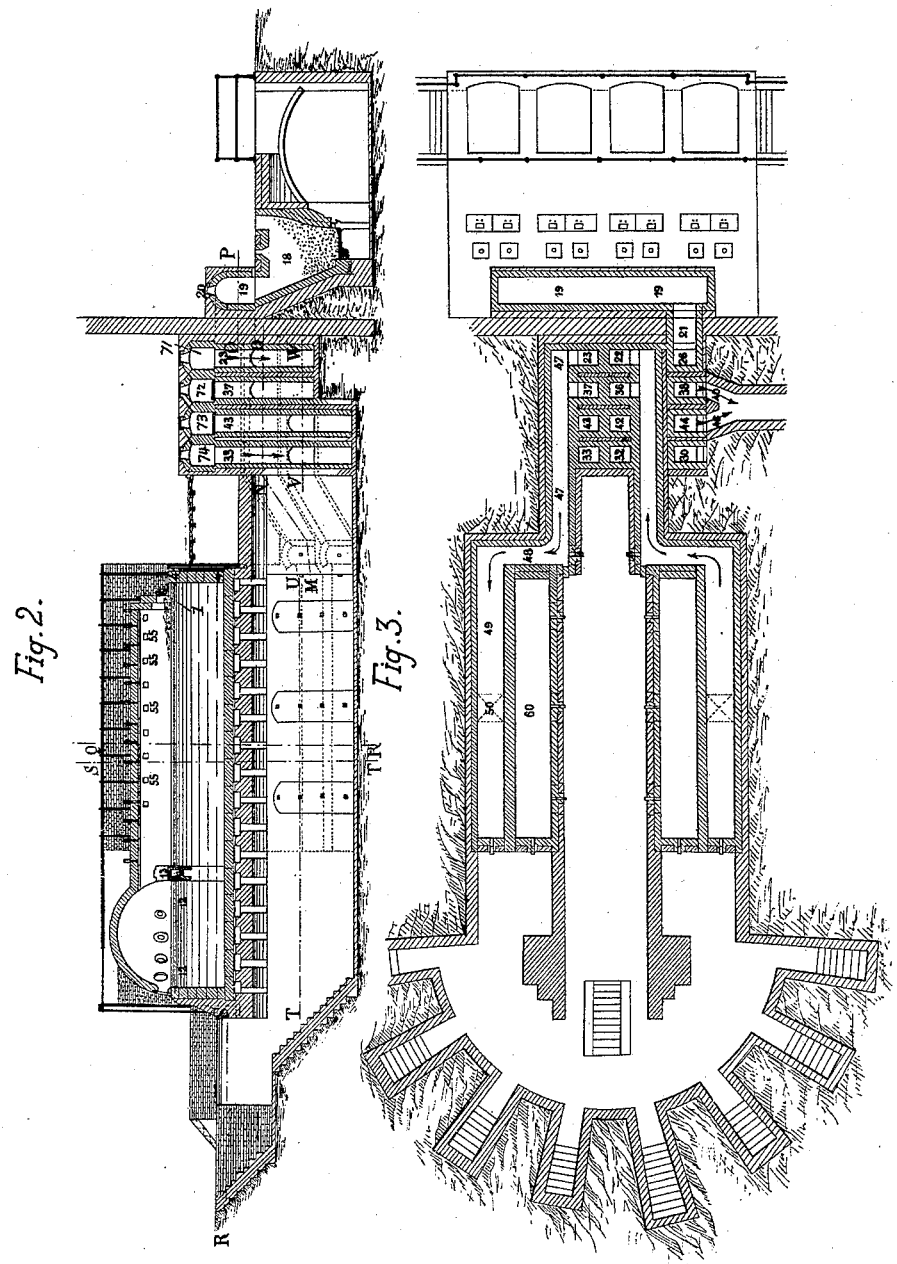

In the annexed drawings, which form a part of this specification, Figure 1 represents a a plan view of my system of glass-furnaces in horizontal section at the height of the working holes. Fig. 2 shows a longitudinal section on the broken line $c\,d\,e\,f\,g\,h\,i\,j$ of Fig. 1. Fig. 3 shows a horizontal section on the broken line T U M N O O P of Fig. 2. Fig. 4 shows a horizontal section of the regenerator on the lines A B and C D of Fig. 8. Fig. 5 represents in its upper part a section of the burners on the line X Y Y Z of Fig. 8. The lower part of this figure shows a section of the reversing-valves on the line Y' Z' of Fig. 9. Fig. 6 represents a horizontal section on the line S T of Fig. 8 and illustrate the ventilation of the under part of the tank. Fig. 7 shows a horizontal section of the valves on the line I J of Fig. 11. Fig. 8 shows in the right-hand part a transverse section of the furnace on the line Q R and for the left-hand part on the line S T, Fig. 2. This latter part, illustrating a gas-inlet or fire-outlet, is shown on a larger scale in Fig. $8^{bis}$. Fig. 9 shows a longitudinal section on the line O P Q R of Fig. 4. Fig. 10 shows a transverse section on the line R S of Fig. 5. Fig. 11 illustrates a transverse section of the valves on the line A B of Fig. 9. Fig. 12 illustrates also a transverse section of the valves on the line C D of Fig. 9. Fig. 13 illustrates a similar section on the line G H of Fig. 9. Fig. 14 illustrates a similar section on the line E F of Fig. 9. Figs. 15 and 16 are details which will be hereinafter more particularly referred to. Figs. 17 and 18 show, respectively, a simple bridge on the molten glass and a bridge composed of a plurality of simple bridges superposed one on the other and dividing the glass to a greater depth than a single bridge. Figs. 19 and 20 show in plan and section the rings on the molten glass, from which rings the glass is taken for working. These bridges are U-shaped in cross-section, thus providing a light, but at the same time strong, structure.

I will now proceed to describe the tank proper, thereby pointing out the essential improvements which constitute the difference between my invention and other systems of tank-furnaces.

*Protection of the front wall.*—The charge to be melted is fed into the tank with an ordinary scoop through a large opening 1, Figs. 1 and 2, the height of which can be increased or diminished by means of a movable fire-proof plate or curtain 2, Figs. 2 and 10, which rests on the base of the tank. This plate or curtain 2 is easily raised or lowered by placing or removing fire-proof wedges 3, Fig. 10, under the edge of the plate or curtain. The solid matter which is introduced into the furnace closes the feed-opening, for it rests on the glass bath and is accumulated before the furnace in a quantity large enough so as to reach to the lower edge of the movable plate or curtain 2. By this arrangement I insure that the vertical wall 4, Figs. 1 and 2, which closes the tank at the feeding side, will constantly be in contact with solid cold matter and cannot be corroded off at its upper part. This wall will also be protected at its lower part, for the melted glass under the solid matter will be scarcely pasty, because it is not exposed to the radiation of the flame of the furnace, this radiation through the glass being completely intercepted by the solid matter which is placed on this side on the surface of the liquid bath. This method of feeding will not only perfectly protect the vertical wall 4, but it presents, moreover, the advantage that it completely prevents the formation of dust in the furnace, which is produced in large quantities by the usual method of feeding, where the charge is thrown into the tank under the fire-jets, which originate this dust and carry it into the burners and into the recuperation-chambers. As I feed the charges of raw materials to the exterior of the tank, the charge only enters the interior of the furnace as the fusion progresses, and this cause of wear is entirely avoided. Consequently I increase in this manner the duration of the fire-mouths, which are ordinarily eaten off by the melting dust which sticks to them, and, moreover, the chambers can operate longer without requiring repairing or cleaning, as no dust will be carried therein.

*Protection of the long sides.*—For the protection of the long sides 5 of the furnace, Fig. 1, I have devised an arrangement founded on the same principles. The first layers 6 of the arch of the furnace, Figs. 8 and $8^{bis}$, project over the glass bath, so as to form between the surface of the glass and the arch a small empty space 7, which will not receive the radiation of the flame of the furnace. This space 7 is filled by way of the lateral openings 8 with substances which do not affect the refractory tiles—such, for instance, as sand, limestone, broken glass, &c.—or which may be merely cooled off by a current of air which may be produced there in any well-known manner. By this arrangement the salts floating on the surface of the glass-bath will be prevented from affecting or corroding the tiles of the walls, and the calorific rays cannot reach the long vertical side walls under the surface of the glass, for the projection of the arch and the solid matter introduced under these projections form a shield which intercepts these rays and prevents them from reaching the walls of the tank, which are consequently constantly in contact with a glass scarcely pasty, which only slightly affects the refractory tiles. If it is not desirable to use this method, the long side walls can be kept cool, as shown in Fig. 15, by arranging against the inner wall a long reservoir or gutter A', made of wrought or cast iron and placed directly against the bricks B', which are to be protected. This reservoir or gutter is arranged between the mountings F' of the furnace and the bricks B'. Iron wedges C' enable me to secure the gutter tightly against the bricks B', and the braces E' maintain the position of the walls of the reservoir. A water-conduit R' constantly conveys cold water into the gutter, and an overflow-pipe T' allows the warm water to escape, so as to keep the water at a suitable temperature. This constantly cool gutter A' prevents the bricks B' from becoming too hot. The liquid glass which may have partly penetrated the bricks by way of accidental breaks in the bricks will almost entirely lose its corrosive action and the leaks of glass will be avoided. I may also effect the cooling of the outer walls either at the place corresponding with the surface of the melted glass or at any other place by currents of cold air, which, in the absence of a cooling by circulating water, as above described, will be sufficient in certain cases to cool the furnace sufficiently to avoid all leaks and to considerably lengthen the duration of the structure. The currents of air can be supplied in any suitable manner, and notably by the action of one or several ventilators o', put in motion by the excess of the draft of the chimney of the furnace. This arrangement is shown in Fig. 16.

The method of the suspension of the vault of the furnace so as to render it independent of the tank in case it is desirable to repair it without putting out the furnace has been studied so as to produce the greatest possible cooling off of this layer for the purpose of lengthening its duration. Instead of being placed within the furnace under the suspended arch, as it is generally done, this layer is, so to say, outside the furnace, and is cooled on two sides, while in the usual arrangement the cooling is merely effected upon the vertical exterior side.

To arrive at the suspension of the arch of the tank to obtain the results I have indicated, I fix brackets 10, of cast or wrought iron, by means of bolts on the mountings 9 of the furnace, Figs. 8 and $8^{bis}$. On these brackets and reaching from one to the other are placed cast-iron plates 11, and on these plates are directly arranged the projecting bricks 6, which form the base of the arch of the furnace. The space 8 between the projections and the upper part of the wall of the tank serves for the introduction of the matter which has for its purpose to protect the inside walls of the furnace.

*Bridges.*—For the purpose of retaining in the melting compartment the liquid salt which rises continually to the surface of the glass and also for the purpose of preventing the wear of the refractory bricks of the working compartment 12, Fig. 2, I place on the glass bath movable bridges 13, formed of long refractory pieces in the shape of an inverted U. I have shown in the drawings, Fig. 2, a bridge formed of two superposed refractory pieces of this shape. As they are of a less density they will float on the bath, and they are kept at their place by means of vertical grooves 14, Fig. 1, arranged in the walls of the tank. Contrary to the general practice, these bridges are made in one piece of the full width of the tank. While a single bridge can be used, Fig. 17, it will be desirable to superpose several of them, Fig. 18, so that in the working compartment 12 only glass is admitted coming from the central layers of the bath, which are generally purer than that on the surface or on the bottom. This is also a very simple way to utilize to advantage the great depth of the glass bath. As a matter of fact the layers of glass will be superposed according to their density in proportion to the stage of refining, and consequently if the fine glass is taken from a depth twice as great as hitherto usual the glass received by the workman at the end of the pipe has been in the tank twice as long. All circumstances being equal, it will consequently be possible to increase the production of a furnace of certain dimensions considerably by taking the fine glass from a greater depth by means of superposed bridges, and also to economize fuel, &c.

The space between the bridges and the working holes—i. e., the working compartment 12—is generally provided with refractory rings 15, Fig. 1, which float on the surface of the glass-bath. In Fig. 1 I have illustrated ordinary rings; but I propose to use (Figs. 19 and 20) rings provided with fire-proof teeth for the purpose of causing all the rings to gear, and even to arrange on the bricks of the inner walls of the working compartment teeth corresponding to those of the rings. This arrangement would present the advantage that if any liquid salt should enter into the working compartment at the ends of the bridges it will be retained by the first rings and can hardly reach the other rings, which are situated before every working hole, from whence the glass which is to be worked is taken.

For the purpose of strengthening the vertical walls of the tank and of avoiding a too great loss of heat by conductivity, I have placed (Fig. 1) iron plates 16 against the mountings of the furnace at a small distance from the walls of the tank. These plates are not riveted together, so that their expansion is not interfered with. They are merely supported by the mountings 9 and are held in place by a layer of sand strongly pressed between the plates and the furnace, so as to protect them from any leak of glass which may escape through the joints of the bricks of the tank. The layer of sand is not arranged throughout the entire height of the vertical walls. At the upper part of the walls the plates are arranged directly on the bricks of the tank and are held in position by means of wedges 17, Figs. 8 and $8^{bis}$, arranged between the mountings and the plates. This arrangement has for its purpose to cool off as much as possible this part of the tank, which always corrodes more than the under parts.

I will now proceed to describe the method of firing this furnace, and especially the features which constitute the difference from other systems. The gas is produced in ordinary apparatus 18 of any suitable type, Figs. 1 and 2. The gas of all the apparatus is collected in a receptacle 19, placed over the same. This receptacle is arranged so that it can be easily cleaned, because the soot will fall, of course, from the receptacle into the gas apparatus in consequence of the agitation in said receptacle of a chain attached to the end of an iron rod, which is passed through the small eyehole 20. The gas is conveyed from the receptacle through the pipe 21, Fig. 3, to the transverse duct 71, having reversible valves. The reversible gas-valves are formed of horizontal apertures 22 and 23, Figs. 3 and 11, which are alternately closed by a refractory damper 24, Fig. 11, and the quantity of gas is regulated by the damper 25, Fig. 11, which allows of an adjustable closing of the aperture 26 of the gas-conduit. These dampers are manipulated by means of an iron rod ending in a hook, which is introduced at the cast-iron vane or air-gate 27 for the reversing of the gases, and at the vane 28 for the purpose of regulating the quantity of gas which is to be used. The reversing of air is done in the same manner, Fig. 13. The air-inlet 29 is in communication with the aperture 30 and cross-duct 74, which is adjustably closed by the damper 31. The apertures 32 and 33 are alternately opened and closed by the air-reversing damper 34. The reversing of the products of combustion is effected separately for the two gas and air chambers. Such as come from the furnace are reversed in the cross-duct 72 by the damper 35, Fig. 12, which alternately opens and closes the pipes 36 and 37. The smoke then goes to the chimney through the aperture 38, which is adjustably closed by the damper 39, and through the pipe 40. The reversing of the products of combustion coming from the air-chambers is effected in the same manner. The smoke coming from the furnace is reversed while passing through the air-chambers by the damper 41, Fig. 14, in the cross-duct 73, which alternately opens and closes the pipes 42 and 43, and is then conveyed to the chimney through the pipe 44, which is adjustably closed by the damper 45.

The valves which I have just described present some advantages over the cast-iron valves generally used. As they are made entirely of fire-proof matter, they can resist high temperatures. They can, consequently, safely be placed right near the gas apparatus, and in this manner a useless cooling off of the gas can be avoided. The length of the gas-receptacle can also be considerably reduced for the purpose of saving room, and the frequent cleanings are avoided, which are necessary in the conduits where the products of combustion are not passed with reversion, for the smoke will always contain an excess of air, which will burn the soot which has set in the conduits. Consequently the gases produced in the apparatus 18, after having been collected in the receptacle 19, pass through the pipe 21 to the reversing apparatus, to be conveyed from there to the right-hand side or to the left-hand side of the furnace, according to the position of the damper 24. If, for instance, the damper 24 covers the pipe 22, Fig. 11, the gases pass through 23 in the direction of the arrows and enter, successively, in the conduits 47, 48, and 49, Fig. 9, from where they pass through the aperture 50 into the gas-chambers 51, formed of parallel walls. They then go upward by way of the standing conduits 52, which are arranged at the two ends of the chambers, and enter into the collector 53, where they are distributed by the small parallel conduits 54 to the fire-mouths 55, Fig. 2, which are arranged in the arch of the tank. The air is admitted into the valves by the apertures 29 and 30, to be conveyed from there to the right or left hand side of the furnace, according to the position of the damper 34. If, for instance, the damper 34 covers the conduit 32, the air will pass, of course, through 33, Fig. 13, and then go successively through the conduits 55, 56, 57, 58, and 59, from where it penetrates into the air-chambers 60, Figs. 10 and 3, to go upward by the way of the standing conduit 61 to the collector 62, from which it is distributed into the parallel conduits 63, which convey it to the small air-holes 64, Figs. 8 and $8^{bis}$, where it is mixed with the gas to enter then, together with it, into the furnace. The air is conducted vertically into the gas-flues by a series of small jets, and in this manner the gas and air are very thoroughly mixed, which has for its result a complete combustion, and consequently a very high temperature and a saving of fuel. The products of combustion escape from the furnace by the fire-mouths placed symmetrically to those which I have described and go downward in the opposite chambers, traveling a way inverse to that of the incoming gases and air. They reach then the reversing-valves 41 and 35 and pass through the conduits 38 and 46, Figs. 12 and 14, into the chimney.

The regulating-dampers 39 and 45, Figs. 13 and 14, enable me to regulate the quantity of products of combustion in each of the chambers, so as to better maintain the equilibrium of temperature in these chambers.

All improvements heretofore described have the double purpose to lengthen the duration of the furnace and to save fuel.

Having fully described my invention, what I claim as new, and desire to secure by Letters Patent, is—

1. The combination, with a glass-furnace tank, of a floating bridge 13, U-shaped in cross-section, and vertical guides or stops for the same adapted to confine it and direct its up-and-down movement, substantially as set forth.

2. The combination, with the tank, of the wall 4, having a feed opening or space, and curtain 2, situated beyond the inner side of the wall, and wedges 3 beneath said curtain, substantially as set forth.

3. The combination, with a glass-furnace tank and stops on the inner walls thereof, of a floating bridge consisting of a plurality of superposed separate bridge portions, substantially as set forth.

4. In combination with the tank of a glass-furnace, the floating working-rings having peripheral teeth, substantially as set forth.

In testimony whereof I have signed this specification in the presence of two subscribing witnesses.

EMILE GOBBE.

Witnesses:
H. JOSSE,
A. ROUSSE.